UNITED STATES PATENT OFFICE.

ERHARD L. MAYER AND HENRY LIEPMANN, OF LONDON, COUNTY OF MIDDLESEX, ENGLAND.

MANUFACTURE OF POROUS POTS FOR ELECTRIC BATTERIES.

SPECIFICATION forming part of Letters Patent No. 417,436, dated December 17, 1889.

Original application filed April 17, 1889, Serial No. 307,562. Divided and this application filed October 9, 1889. Serial No. 326,510. (No model.) Patented in England July 20, 1887, No. 10,177, and in Belgium June 29, 1889, No. 86,807.

*To all whom it may concern:*

Be it known that we, ERHARD LUDWIG MAYER and HENRY LIEPMANN, both subjects of the Queen of Great Britain, residing at London, in the county of Middlesex, England, have invented certain new and useful Improvements in the Manufacture and Treatment of Porous Pots, Plates, or Partitions for Electric Batteries, (for which we have received Letters Patent in England, No. 10,177, dated July 20, 1887, and in Belgium, No. 86,807, dated June 29, 1889;) and we do hereby declare that the following is a full, clear, and exact description of the invention, which will enable others skilled in the art to which it appertains to make and use the same.

This application is a division of our original application filed April 17, 1889, Serial No. 307,562.

Our invention relates to improvements in the manufacture and treatment of porous pots, plates, or partitions for electric batteries whereby certain advantages are obtained.

The invention also relates to the article produced by our novel method.

A drawback which exists in porous pots, plates, or partitions as at present constructed lies in the fact that it is extremely difficult, or even impossible, to make them of such uniform structure and composition that they will always offer a constant resistance to the passage through them either of the electrolyte or electrolytes with which they are employed or of a constituent or constituents thereof. As at present manufactured the porous pots, plates, or partitions vary enormously in resistance among themselves, and those suited for any particular purpose can only be separated and chosen by a system of careful selection.

The object of our invention is to overcome this drawback and to enable porous pots, plates, or partitions to be constructed of any desired and predetermined resistance, so as to be exactly suited for the purpose for which they are to be employed—that is, suited to the nature of the battery materials with which they are to be in contact.

In carrying our invention into effect we employ pots, plates, or partitions constructed of inorganic mineral matter—preferably of biscuit-ware or of porous earthenware—after the usual manner, but preferably of as open a texture as is convenient, and in order to bring them up to the requisite resistance we precipitate or deposit in their pores and on their surface bodies of such nature that when the porous pots, plates, or partitions are in use the said bodies will not themselves enter into any chemical action with the electrodes or electrolytes, (or otherwise undergo chemical or physical change,) which will be deleterious to the action of the battery. In bringing about such precipitation or deposition we impregnate the aforesaid porous pots, plates, or partitions with a substance or compound containing the body or element which it is desired to precipitate or deposit, and thereafter we subject the impregnated porous pots, plates, or partitions to the action of heat, so as to bring about the necessary decomposition for the purpose of depositing in the pores and interstices of the porous pots, plates, or partitions the body required to be precipitated or deposited.

Having thus described in general terms the nature and object of our invention, we shall now proceed to describe in what manner it is to be or may be carried into effect, and for this purpose we shall describe by way of a type or example one way of carrying out our invention.

In the following description we show specifically how we may perform our invention in the case of a porous partition-plate made of inorganic mineral matter, and we desire it to be understood that such description applies equally well when a porous pot or porous cell is treated instead of a porous plate. As a convenient way of treating such a plate, we immerse the plate in a solution of sugar, leaving it therein for a sufficient time to allow of the solution soaking thoroughly into it, after which we remove the plate and subject it to a high temperature in a closed vessel and either packed or not with powdered charcoal for the purpose of carbonizing the sugar and depositing the carbon thereof in the pores and interstices of the plate. In practice we find it convenient to keep the sugar solution at a temperature close to that of the boiling-point of water during nearly the whole of the time that the plate is immersed and allow it to cool down before the plate is removed. We find that employing a thirty per cent. solution of sugar and soaking the plate therein for a period of, say, five hours gives good results. If it should be found that the plate has not been brought up to a sufficient resistance the process must be repeated as often as required, preferably using a weaker solution with each repetition to avoid exceeding the required limit.

It will be seen that by means of our invention any desired predetermined resistance of the porous pots, plates, or partitions may be obtained.

It will be understood that our invention contemplates the use of pots, plates, or partitions made of inorganic mineral material, which does not include carbon, the same being considered as organic.

Having thus described our invention, what we claim, and desire to secure by Letters Patent, is—

1. The improvements in the manufacture or treatment of porous pots, plates, or partitions of inorganic mineral material for electric batteries, consisting in the impregnation of the same with a substance containing the body or elements to be deposited and afterward decomposing said substance by the action of heat, so as to bring about the necessary decomposition of the said substance for the purpose of precipitating or depositing the said body in the pores and interstices of the said porous pots, plates, or partitions.

2. The improvement in the manufacture or treatment of porous pots, plates, or partitions of inorganic mineral material for electric batteries, consisting in the impregnation of the same with a substance containing in combination carbon, then decomposing said substance by the action of heat, so as to precipitate or deposit the said carbon in the pores or interstices of the said porous pots, plates, or partitions.

3. The improvement in the manufacture or treatment of porous pots, plates, or partitions of inorganic mineral material for electric batteries, consisting in the suitable impregnation of the same with sugar, then decomposing the sugar by the action of heat, so as to bring about the necessary decomposition of the same for the purpose of precipitating or depositing carbon in the pores or interstices of the said porous pots, plates, or partitions.

4. An improved pot, plate, or partition for electric batteries, substantially as hereinbefore set forth, which consists in porous inorganic mineral matter having carbon deposited in the pores and on the surface thereof.

In witness whereof we have hereunto signed our names in the presence of two subscribing witnesses.

ERHARD L. MAYER.
HENRY LIEPMANN.

Witnesses:
CHARLES J. H. THOMAS,
PAUL POLLOCK.